3,178,464
PRODUCTION OF ORGANOSILICON COMPOUNDS
Edward Keith Pierpoint, Liverpool, England, assignor to Imperial Chemical Industries Limited, London, England, a corporation of Great Britain
No Drawing. Filed Nov. 1, 1961, Ser. No. 149,211
Claims priority, application Great Britain, Nov. 7, 1960, 38,153/60
8 Claims. (Cl. 260—448.2)

This invention relates to the production of organosilicon compounds and more particularly to the production of such compounds by the reaction of a compound containing a silicon-bonded hydrogen atom with a compound containing at least one unsaturated linkage.

It is known that silicon compounds containing a silicon-bonded hydrogen atom can be reacted with certain compounds containing unsaturated linkages. For the carrying out of such reactions a number of catalysts have been used or proposed for use, for example, organic peroxides, platinized charcoal and metals such as platinum. A catalyst which has also been proposed for use is chloroplatinic acid. These catalysts, however, have in many cases definite limitations and do not always give the desired results. Thus, for example, in some cases the reaction does not proceed at a reasonable rate below the decomposition temperatures of the reactants while in other cases the yield of product leaves much to be desired and in still other cases difficulties may be experienced in separating the catalyst from the desired end product of the reaction.

An object of the present invention is to provide a new and useful process for the reaction of a silicon compound containing a silicon-bonded hydrogen atom with a compound containing an unsaturated linkage. Another object is to provide such a process which is capable of giving good yields of high quality end product. Other objects will appear hereinafter.

According to the present invention these objects are accomplished by reacting together a silicon compound containing a silicon-bonded hydrogen atom and an unsaturated compound in the presence of a complex of a platinous salt and an olefine.

Any silicon compound containing at least one silicon atom having at least one and not more than two hydrogen atoms bonded thereto may be used in the process of my invention. The compound used may be for example, a monomeric compound, a polymer, a copolymer or a mixture of such materials. Suitable materials which may be employed include halogenosilanes, organohalogenosilanes, polysilanes, polysiloxanes, polysilcarbanes and like structures. In these compounds the organo groups may be the same or different and may be alkyl groups such as methyl, ethyl, propyl or butyl groups, cycloalkyl groups such as cyclohexyl groups, aryl groups such as phenyl groups, aralkyl groups such as benzyl groups, alkaryl groups such as tolyl groups or haloaryl groups such as mono- or di-chlorophenyl groups. It is, however, in general preferred that the organo groups should be methyl or phenyl groups. The organo groups may also be unsaturated aliphatic groups such as vinyl or allyl groups or unsaturated alicyclic groups such as cyclohexenyl groups. Suitable examples of such compounds of silicon are methyldichlorsilane, dimethylchlorsilane, trichlorsilane, diphenylsilane, methylphenylchlorsilane, 1:4-bis(dimethylsilyl)benzene, 1:3:5:7-tetramethylcyclotetrasiloxane, di-(trimethylsilyl) polymethylhydrogensiloxanes and siloxanes containing both —$Si(CH_3)_2O$— units and —$Si(CH_3)HO$— units.

The preferred compounds are however substituted silanes such as those of the general formula $R_aSiH_bX_{4-a-b}$ where R is a hydrocarbon group, X is a halogen atom, an alkoxy or aryloxy group, $a$ is 0, 1 or 2, $b$ is 1 or 2 and $a+b$ is not greater than 4, the hydrolysis products of these compounds and the products obtained by cohydrolysis of these with other silanes such as, for example, diorganodihalogenosilanes.

The unsaturated reactant used in the process of our invention may be any unsaturated compound containing at least one pair of carbon atoms linked by a multiple bond except aliphatic amines, aldehydic compounds and compounds having a cyano group on an unsaturated carbon atom. The compounds used may be purely organic compounds or may be organometallic compounds, for example, organosilicon compounds. It is also in general preferred that if the unsaturated reactant is a hydrocarbon it should have not more than 24 carbon atoms. Suitable compounds include ethylene, propylene, butylene and homologues thereof, the acetylene series, diolefines such as butadiene and its homologues, alkenynes such as vinylacetylene and divinylacetylene, alicyclic substances such as cyclopentene and cyclohexene, organosilicon compounds such as vinyltrimethylsilane, allyltrimethylsilane, diallydimethylsilane, diallytetramethyldisiloxane, methylvinylpolysiloxanes containing varying proportions of vinyl groups, esters of unsaturated acids containing not more than 18 carbon atoms such as methyl or ethyl oleate, crotonate, acrylate or methacrylate, esters of unsaturated alcohols such as vinylacetate, allyl acetate and butenyl acetate and the like.

It may in some cases be desirable to have the unsaturated group and the Si-H groups present in the molecule in which case the reaction product is a polymeric material. If the molecule has only one silicon-bonded hydrogen atom and one unsaturated group a linear or cyclic polymer is formed. Examples of suitable silanes for this purpose are dimethylvinylsilane, diphenylvinylsilane, methylphenylvinylsilane, 1-(dimethylsilyl)-4-(dimethylvinlsilyl)-benzene, allyldimethylsilane and allylmethylphenylsilane and allyldiphenylsilane.

The compex as a platinous salt and an olefine may be prepared in a variety of ways. The preparation of suitable complexes has been described for example, by Kharasch J.A.C.S., 1936, 58, 1733, and MacNevin, Giddings and Foris, Chemistry & Industry, 1958, 557. Suitable complexes include those of ethylene, propylene, butylene, cyclohexene and styrene with platinous chloride. It is in general preferred that the platinous salt which is complexed is the chloride although other salts such as the bromide may also be used. It is further preferred in many cases that the complex should be that of platinous chloride with cyclohexene because of its stability and ease of preparation. In certain cases another preferred complex is that of platinous chloride with ethylene.

The proportion of platinum salt complex to the two reactants may vary widely for example, from $10^{-2}$ to $10^{-8}$ moles per mole of unsaturated reactants. It is however normally preferred to use proportions of the order of form $10^{-4}$ to $10^{-6}$ moles per mole of unsaturated reactant.

The reaction may be carried out over a wide range of temperature and the optimum temperature will depend largely in any specific reaction on the nature of the reactants. It is normally convenient to carry out the reaction at a temperature not greater than 300° C. but the maximum temperature possible will be determined by the stability of the reactants and the desirability of avoiding thermal decomposition. It is, however, normally preferred to initiate the reaction at a temperature within the range from 10 to 150° C. and to maintain the temperature substantially within this range.

The time required to complete the reaction will also depend on the specific reactants, the reaction temperature and the catalyst concentration. Normally a reaction time of up to eight hours is adequate and in many cases a substantially quantitative yield of product is obtained in a reaction time of the order of 30 minutes or less.

The reaction may be carried out at atmospheric or superatmospheric pressure. The choice of conditions will depend largely on the nature of the reactants, for example, in the case of non-volatile reactants it may well be convenient to carry out the reaction at atmospheric pressure while in the case of reactants which are gaseous at ordinary temperatures reaction under superatmospheric pressure may well be more convenient.

My invention is further illustrated by the following examples in which all parts and percentages are by weight.

Example 1

1000 parts of a toluene solution containing 0.3 part of a cyclohexene/platinous chloride complex prepared by the method described by Kharasch (loc. cit.) was added to 14600 parts of methylphenylvinylsilane at 20° C. Reaction began almost immediately and the temperature rose to 75° C. in about 8 minutes without external heating. The reaction became very vigorous during the next 2 minutes in which period the temperature rose to 200° C. The reaction mixture was then cooled and there was obtained a viscous mixture of linear and cyclic polymers.

Example 2

One part of a styrene/platinous chloride complex was dissolved in 1000 parts of methylphenylvinylsilane. A very vigorous reaction began within 5 minutes and the temperature of the reaction mixture rose from 20° C. to 140° C. The reaction mixture was allowed to cool to 100° C. and maintained at that temperature for 30 minutes. On cooling there was obtained a product similar to that of Example 1.

Example 3

One part of the cyclohexene/platinous chloride complex used in Example 1 was dissolved in 1000 parts of a 55 percent solution of divinyl benzene in ethylvinyl benzene. To this solution there was added 500 parts of 1,3,5,7-tetramethylcyclotetrasiloxane and the mixture heated to 100° C. over a period of 5 minutes. A vigorous reaction ensued and on cooling there was obtained a stiff gel.

For purposes of comparison the process was repeated with the omission of the complex. In this case no reaction occurred.

Example 4

4000 parts of vinyl acetate, 3000 parts of methyldichlorsilane and 100 parts of a toluene solution containing 0.3 part of the cyclohexene/platinous chloride complex used in Example 1 were heated together under reflux for a period of 24 hours. The temperature of the refluxing mixture increased from 58° C. to 106° C. within 1 hour and remained at 106° C. thereafter. The reaction product was fractionally distilled to give 4180 parts of an addition product having a boiling point of 110–118° C. at 55 mm. Hg.

Example 5

10 parts of 1,3,5,7-tetramethylcyclotetrasiloxane were added to a solution of 17.3 parts of styrene in 30 parts of toluene and 0.0006 part of the cyclohexene/platinous chloride complex used in Example 1 and the mixture was heated to 80° C. whereupon a vigorous reaction started and the temperature rose to 125° C. The mixture was thereafter heated under reflux for 2 hours causing the liquid temperature to rise to 130–134° C. The toluene was removed by distillation to give an addition product which was a colourless oil of boiling point 250–260° C. at 0.05 mm. Hg.

Example 6

29 parts of methyldichlorsilane were added to 17 parts of allylcyanide and 1 part of toluene containing 0.0003 part of the cyclohexene/platinous chloride complex used in Example 1. The mixture was heated to 60° C. over 30 minutes, at which temperature it began to reflux and the reaction became sufficiently vigorous to raise the liquid temperature to 100° C. within a further 5 minutes and to maintain a temperature of 95–100° C. for a further 10 minutes without external heating. External heating was then resumed and the temperature raised to 120–140° C. and maintained thereat for 4 hours. Fractionational distillation of the reaction mixture yielded 39 parts of an addition product boiling at 120–122° C. at 13 mm. Hg.

Example 7

1 part of ethylene platinous chloride complex (prepared by the method of Kharasch et al. (loc. cit.)) was dissolved in 1000 parts of methylphenylvinylsilane. A vigorous reaction began almost immediately and a mixture of linear and cyclic polymers was obtained similar to that of Example 1.

Example 8

A mixture of 560 parts of commercial diisobutylene, boiling range 98–120.5° C. and consisting mainly of a mixture of 2,4,4-trimethylpentene-1 and 2,4,4-trimethylpentene-2, 575 parts of methyldichlorsilane and a solution of 0.035 part of the cyclohexene platinous chloride complex used in Example 1 in 10 parts of benzene (equivalent to $2 \times 10^{-5}$ gm. atoms Pt per gm. mol. diisobutylene) was allowed to stand at 20° C. over a period of 75 minutes the temperature of the mixture rose slowly to 38° C. and then rapidly to 75° C. within the next 15 minutes. The reactants were then cooled to maintain the temperature at 65°–70° C. This exothermic reaction continued for a further 1½ hours after which time the mixture was heated under total reflux for 2 hours and then fractionally distilled to give 873 parts of an addition product, B.P. 85–87° C. at 11 mm. Hg; $n_D^{22}$, 1.4410. Analysis of the product gave: C, 47.85; H, 9.04; Si, 12.48; Cl, 31.00 percent ($C_9H_{20}SiCl_2$ requires: C, 47.55; H, 8.88; Si, 12.36; Cl, 31.23 percent).

For purposes of comparison a similar preparation was carried out using chloroplatinic acid as catalyst. Diisobutylene and methyldichlorsilane in the same amounts as before were mixed together at 20° C. in the presence of a solution of 0.0488 part of chloroplatinic acid tetrahydrate in 9 parts of benzene and 1 part of isopropanol (equivalent to $2 \times 10^{-5}$ gm. atoms Pt per gm. mol. diisobutylene). The rate of self heating in this preparation was considerably less than in that using the olefine platinous chloride catalyst, indicating the greater activity of the latter material. The rise in temperature to 65° C. in this case occurred over a period of 150 minutes compared to 85 minutes in the case of the previously described preparation. A somewhat lower yield of addition product viz. 827 parts, was obtained upon working up the reaction mixture after the same reaction time had elapsed.

Example 9

A mixture of 40 parts of trichlorsilane, 22.4 parts of commercial diisobutylene, and a solution of 0.017 part of the cyclohexene platinous chloride complex used in Example 1 in 4 parts of benzene was heated under reflux for 6 hours, during which time the temperature of the mixture rose from 43° to 58° C. Unreacted trichlorsilane was removed by distillation at atmospheric pressure and the residual liquid fractionated under reduced pressure to give 44.4 parts of an addition product, B.P. 91–95° C./15 mm. Hg. Analysis of the product gave: C, 39.09; H, 6.84; Si, 11.73; Cl, 41.78 percent ($C_8H_{17}SiCl_3$ requires: C, 38.77; H, 6.92; Si, 11.33; Cl, 42.97 percent).

The yield of addition product corresponds to an 89 percent usage of diisobutylene.

Example 10

A mixture of trimethylchlorsilane and methyldichlorsilane in the molecular ratio of 1 to 26 was cohydrolysed to give a polysiloxane fluid of viscosity 40–50 centipoises at 25° C. 60 parts of this fluid, 120 parts of styrene and a solution of 0.0018 part of the cyclohexene platinous chloride complex used in Example 1 in 0.5 part of benzene were mixed together at 20° C. and maintained under an atmosphere of nitrogen. A vigorous reaction began within 20 minutes and the temperature rose rapidly to about 180° C. and then fell slowly, whereupon the mixture was maintained at 140–170° C. for 2 hours by heating. Unreacted styrene was removed by distillation under reduced pressure and the residual viscous oil dissolved in light petroleum, B.P. 80–100° C., and filtered through a diatomaceous earth to remove insoluble material. Removal of the petroleum ether gave the addition product as a clear viscous oil. A toluene solution of the product liberated hydrogen upon treatment with alcoholic potassium hydroxide in an amount consistent with the reaction with styrene of more than 95 percent of the SiH groups originally present in the polysiloxane fluid.

Example 11

22.4 parts of commercial diisobutylene, 11.8 parts of the methylpolysiloxane fluid used in Example 10, and a solution of 0.007 part of the cyclohexene platinous chloride used in Example 1 in 2 parts of benzene (equivalent to $1 \times 10^{-4}$ gm. atoms Pt per gm. mol. of diisobuytlene) were heated under reflux for 2 hours. The benzene and unreacted diisobutylene were removed by distillation under reduced pressure to give 25.2 parts of the addition product as an oil of viscosity 613 centipoises at 25° C. This yield corresponds to a reaction of 65 percent of the available SiH groups with diisobutylene.

Example 12

A mixture of trimethylchlorsilane, dimethyldichlorsilane and methyldichlorsilane in the molecular proportion 2:9:9 was hydrolyzed to give a polysiloxane fluid. Low boiling material was distilled from the cohydrolysate at a pressure of 20 mm. Hg until the vapour temperature reached 70° C. The devolatilised oil had a viscosity of 7 centipoises at 25° C.

A mixture of 50 parts of this polysiloxane fluid, 35 parts of styrene and a solution of 0.0035 part of the cyclohexene platinous chloride complex used in Example 1 in 1 part of benzene (equivalent to $3 \times 10^{-5}$ gm. atoms Pt per gm. mol. of styrene) was heated to 45° C. A vigorous reaction ensued causing the temperature of the reactants to rise to 130° C. within 1 minute. The temperature was thereafter maintained at 90–100° C. for 3 hours by heating. The product, which was separated from a small amount of an immiscible deposit, was a hazy liquid of viscosity 48 centipoises at 25° C.

The amount of hydrogen liberated by treating a toluene solution of the product with alcoholic potassium hydroxide was consistent with a reaction with styrene of over 95 percent of the SiH groups present in the original fluid.

Example 13

A mixture of 80 parts of 1,3,5,7-tetramethylcyclotetrasiloxane, 150 parts of methylmethacrylate containing 0.5 percent of hydroquinone and 100 parts of cyclohexane was heated to reflux and 90 parts of the cyclohexane removed by distillation. 1000 parts of dry n-heptane was added to the dry reactants followed by a solution of 0.0087 part of cyclohexane platinous chloride in 3 parts of benzene and the whole heated under reflux for 12 hours. After cooling the mixture was filtered to remove a small amount of white solid. 130 parts of the addition product was obtained as an oil, B.P. 200–205° C./0.3 mm. Hg, which was further purified by fractional distillation to give a product, B.P. 180–182° C./0.04 mm. Hg, $n_D^{25}$ 1.4482.

Example 14

A mixture of 126 parts of methylphenylvinylchlorsilane and a solution in 5 parts of benzene of 0.00175 part of the cyclohexene platinous chloride complex used in Example 1 was heated to 110° C. and 150 parts of diphenylchlorsilane were slowly added over a period of 30 minutes. An exothermic reaction commenced on the addition of the diphenylchlorsilane and the temperature of the mixture rose to 125° C. and was maintained at 115–125° C. during the addition. The mixture was heated at 130–140° C. for a further 2 hours and then distilled to give 240 parts of product, B.P. 160–190° C. at 0.1 mm. Hg. Fractional distillation of this material at 0.05–0.1 mm. Hg gave 63 parts, B.P. 170–180°, neutralization equivalent=195; 89 parts, B.P. 180–184° C. neutralization equiv.=199; and 60 parts, B.P. 184–190° C.

The theoretical neutralization equivalent for $C_{21}H_{22}Si_2Cl_2$=200.8.

What I claim is:

1. In a process of reacting a compound having aliphatic unsaturation and being free from amino, aldehydo and radicals having a cyano group on an unsaturated carbon atom with a silicon compound containing at least one silicon-bonded hydrogen atom and having not more than two hydrogen atoms attached to any one silicon atom, in the presence of a platinum catalyst, said silicon compound being selected from the group consisting of a silane of the general formula $R_aSiH_bX_{4-a-b}$ where R is a hydrocarbon group; X is selected from the group consisting of halogen, alkoxy and aryloxy; $a$ is selected from the group consisting of 0, 1 and 2; $b$ is selected from the group consisting of 1 and 2 and $a+b$ is not greater than 4, a hydrolysis product of such a silane and a cohydrolysis product of such a silane with another hydrolyzable silane, the improvement which comprises using as the platinum catalyst, a complex of a platinous halide selected from the group consisting of platinum chloride and platinous bromide with an olefin selected from the group consisting of ethylene, propylene, butylene, cyclohexene and styrene.

2. A process as claimed in claim 1 wherein the complex is that of platinous chloride and cyclohexene.

3. A process as claimed in claim 1 wherein the complex is that of platinous chloride and ethylene.

4. A process as claimed in claim 1 wherein the proportion of platinous salt complex to the unsaturated reactant is from $10^{-2}$ to $10^{-8}$ moles per mole.

5. A process as claimed in claim 4 wherein the proportion is from $10^{-4}$ to $10^{-6}$ moles per mole of unsaturated reactant.

6. A process as claimed in claim 1 wherein the reaction is carried out at a temperature not greater than 300° C.

7. A process as claimed in claim 6 wherein the reaction is carried out at a temperature in the range from 10 to 150° C.

8. In a process of reacting a compound selected from the group consisting of ethylene, propylene, butylene, acetylene, butadiene, vinylacetylene and divinylacetylene, cyclopentene, cyclohexene, vinyltrimethylsilane, allyltrimethylsilane, diallyldimethylsilane, diallyltetramethyldisiloxane, methylvinylpolysiloxane, methyl oleate, ethyl oleate, vinylacetate, allyl acetate and butenyl acetate, with a silicon compound containing at least one silicon-bonded hydrogen atom and having not more than two hydrogen atoms attached to any one silicon atom, in the presence of a platinum catalyst, said silicon compound being selected from the group consisting of a silane of the general formula $R_aSiH_bX_{4-a-b}$ where R is a hydrocarbon group; X is selected from the group consisting of halogen, alkoxy and aryloxy; $a$ is selected from the group consisting of 0, 1 and 2; $b$ is selected from the group consisting of 1 and 2 and $a+b$ is not greater than 4, a hydrolysis product of such a silane and a cohydrolysis product of such a silane with another hydrolizable silane, the improvement which comprises using as the platinum catalyst, a complex of a platinous halide selected from the group consisting of platinous chloride and platinous bromide with an olefin selected from the group consisting of ethylene, propylene, butylene, cyclohexene and styrene.

References Cited by the Examiner
UNITED STATES PATENTS 2,823,218   2/58   Speier et al. ......... 260—448.2

OTHER REFERENCES

Speier et al.: "Journal of American Chemical Society," vol. 79 (1957), pp. 974–9.

Kharasch et al.: Ibid., vol. 58 (1936), pp. 1733–8.

TOBIAS E. LEVOW, Primary Examiner.

SAMUEL H. BLECH, ALPHONSO D. SULLIVAN, Examiners.